United States Patent
Polyakov et al.

(10) Patent No.: US 8,042,186 B1
(45) Date of Patent: Oct. 18, 2011

(54) SYSTEM AND METHOD FOR DETECTION OF COMPLEX MALWARE

(75) Inventors: Alexey A. Polyakov, Moscow (RU); Vladislav V. Martynenko, Moscow (RU); Yuri G. Slobodyanuk, Moscow (RU); Denis A. Nazarov, Moscow (RU); Mikhail A. Pavlyushchik, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 13/096,227

(22) Filed: Apr. 28, 2011

(51) Int. Cl.
*G06F 11/00* (2006.01)
*G06F 12/14* (2006.01)
*G06F 12/16* (2006.01)
*G08B 23/00* (2006.01)

(52) U.S. Cl. ............................................. 726/24; 726/25
(58) Field of Classification Search ...................... 726/22, 726/23, 24, 25
See application file for complete search history.

(56) References Cited

U.S. PATENT DOCUMENTS

| | | | |
|---|---|---|---|
| 5,440,723 A | 8/1995 | Arnold et al. | |
| 6,775,780 B1 | 8/2004 | Muttik | |
| 6,944,772 B2 | 9/2005 | Dozortsev | |
| 6,973,577 B1 | 12/2005 | Kouznetsov | |
| 6,981,279 B1 | 12/2005 | Arnold et al. | |
| 7,472,288 B1* | 12/2008 | Chou et al. ..................... | 713/193 |
| 7,472,420 B1* | 12/2008 | Pavlyushchik .................. | 726/24 |
| 7,665,138 B2 | 2/2010 | Song et al. | |
| 7,698,744 B2 | 4/2010 | Fanton et al. | |
| 7,707,620 B2* | 4/2010 | Cherepov ......................... | 726/1 |
| 7,836,500 B2* | 11/2010 | Nason et al. ..................... | 726/22 |
| 2002/0083334 A1 | 6/2002 | Rogers et al. | |
| 2003/0233566 A1* | 12/2003 | Kouznetsov et al. ......... | 713/200 |
| 2004/0025015 A1 | 2/2004 | Satterlee et al. | |
| 2005/0188370 A1* | 8/2005 | Kouznetsov et al. ......... | 717/174 |
| 2005/0240769 A1 | 10/2005 | Gassoway | |
| 2005/0283838 A1* | 12/2005 | Saito ............................... | 726/24 |
| 2006/0179484 A1 | 8/2006 | Scrimsher et al. | |
| 2007/0016953 A1* | 1/2007 | Morris et al. .................... | 726/24 |
| 2007/0067843 A1 | 3/2007 | Williamson et al. | |
| 2007/0094496 A1* | 4/2007 | Burtscher ....................... | 713/164 |
| 2007/0143843 A1* | 6/2007 | Nason et al. ..................... | 726/22 |
| 2007/0150956 A1 | 6/2007 | Sharma et al. | |
| 2007/0199060 A1 | 8/2007 | Touboul | |
| 2007/0240221 A1* | 10/2007 | Tuvell et al. ..................... | 726/24 |
| 2007/0256082 A1* | 11/2007 | Bhagwan et al. ............. | 719/316 |
| 2008/0016339 A1 | 1/2008 | Shukla | |
| 2008/0114957 A1 | 5/2008 | Safa | |
| 2008/0155153 A1* | 6/2008 | Yoshii et al. ................... | 710/262 |

(Continued)

OTHER PUBLICATIONS

Koike, R. et al., "Development of System for the Automatic Generation of Unknown Virus Extermination Software", Proceedings of the 2007 International Symposium on Applications and the Internet (SAINT '07), pp. 1-7.

*Primary Examiner* — David Garcia Cervetti
(74) *Attorney, Agent, or Firm* — Arent Fox LLP; Michael Fainberg

(57) ABSTRACT

Disclosed are systems, methods and computer program products for detection of malware with complex infection patterns. The system provides enhanced protection against malware by identifying potentially harmful software objects, monitoring execution of various processes and threads of potentially harmful objects, compiling contexts of events of execution of the monitored processes and threads, and merging contexts of related processes and threads. Based on the analysis of the individual and merged object contexts using malware behavior rules, the system allows detection of malicious objects that have simple and complex behavior patterns.

20 Claims, 5 Drawing Sheets

U.S. PATENT DOCUMENTS

| | | |
|---|---|---|
| 2008/0172563 A1 | 7/2008 | Stokes |
| 2009/0037991 A1* | 2/2009 | Ellis et al. .......................... 726/6 |
| 2011/0023120 A1* | 1/2011 | Dai et al. ......................... 726/23 |
| 2011/0083186 A1* | 4/2011 | Niemela et al. ................. 726/24 |

* cited by examiner

SYSTEM AND METHOD FOR DETECTION OF COMPLEX MALWARE

TECHNICAL FIELD

The present invention relates to the field of computer security and, in particular, to systems and methods for computer protection from malware with complex infection patterns.

BACKGROUND

Computer malware, such as viruses, worms and Trojan horses, present significant security threats to computer systems and networks. To combat the ever increasing spread of computer malware, a large number of antivirus detection techniques were developed. However, not all malware detection methods are effective in protecting computers against malware; especially when the malware is specifically designed to bypass these detection methods.

In the simplest case, a malware can be a single component or object, for example an executable file that, if launched, performs actions that can cause damage to the computer. Common malware detection techniques, such as signature or heuristic analysis, will typically detect single component malware. However, more complex malware consists of multiple components, with each component performing certain actions; for example, one component may perform actions with files, the second component may modify system registry, and the third component may perform networking functions. Furthermore, each component by itself may not perform malicious actions, but if their actions are combined, they can cause damage to the computer. The common malware detection methods may not be effective in detecting of such multi-component malware with complex infection pattern.

Accordingly, there is a need for a new technique for detection of malware having complex infection patterns.

SUMMARY

Disclosed are systems, methods and computer program products for detection of computer malware. In one example embodiment, the method comprises monitoring by a malware detection system execution of processes or threads of one or more software objects on a computer. The system than determines if the one or more objects are trusted objects by computing digital signatures of the objects and checking if the digital signatures are associated with trusted objects. If the objects are trusted, the system discontinues monitoring of one or more processes or threads of the trusted object. If the one or more objects are not trusted, the system stores in a plurality of separate object contexts events of execution of the monitored processes or threads of each non-trusted object. The system then separately analyzes events of the execution of the monitored process or thread stored in each object context using malware behavior rules to identify malicious objects. If the events of execution of the monitored process or thread in separate object contexts are not malicious, the system determines if the monitored processes or threads are related to each other and merges contexts of related processes or threads into a common context. The system then analyzes the events stored in the common context using malware behavior rules to identify malicious objects having complex behavior.

The above simplified summary of example embodiments of the invention serves to provide a basic understanding of such embodiments. This summary is not an extensive overview of all contemplated aspects of the invention, and is intended to neither identify key or critical elements of all embodiments nor delineate the scope of any or all embodiments. Its sole purpose is to present some concepts of one or more aspects in a simplified form as a prelude to the more detailed description that follows. To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various aspects of the invention may be employed, and this description is intended to include all such aspects of the invention and their equivalents.

BRIEF DESCRIPTION OF THE DRAWINGS

The accompanying drawings, which are incorporated into and constitute a part of this specification, illustrate one or more example embodiments of the invention and, together with the detailed description serve to explain their principles and implementations.

In the drawings.

DETAILED DESCRIPTION OF EXAMPLE EMBODIMENTS

Example embodiments of the present invention are described herein in the context of systems, methods and computer program products for detection of computer malware. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments of the invention as illustrated in the accompanying drawings. The same reference indicators will be used to the extent possible throughout the drawings and the following description to refer to the same or like items.

Figure 1:
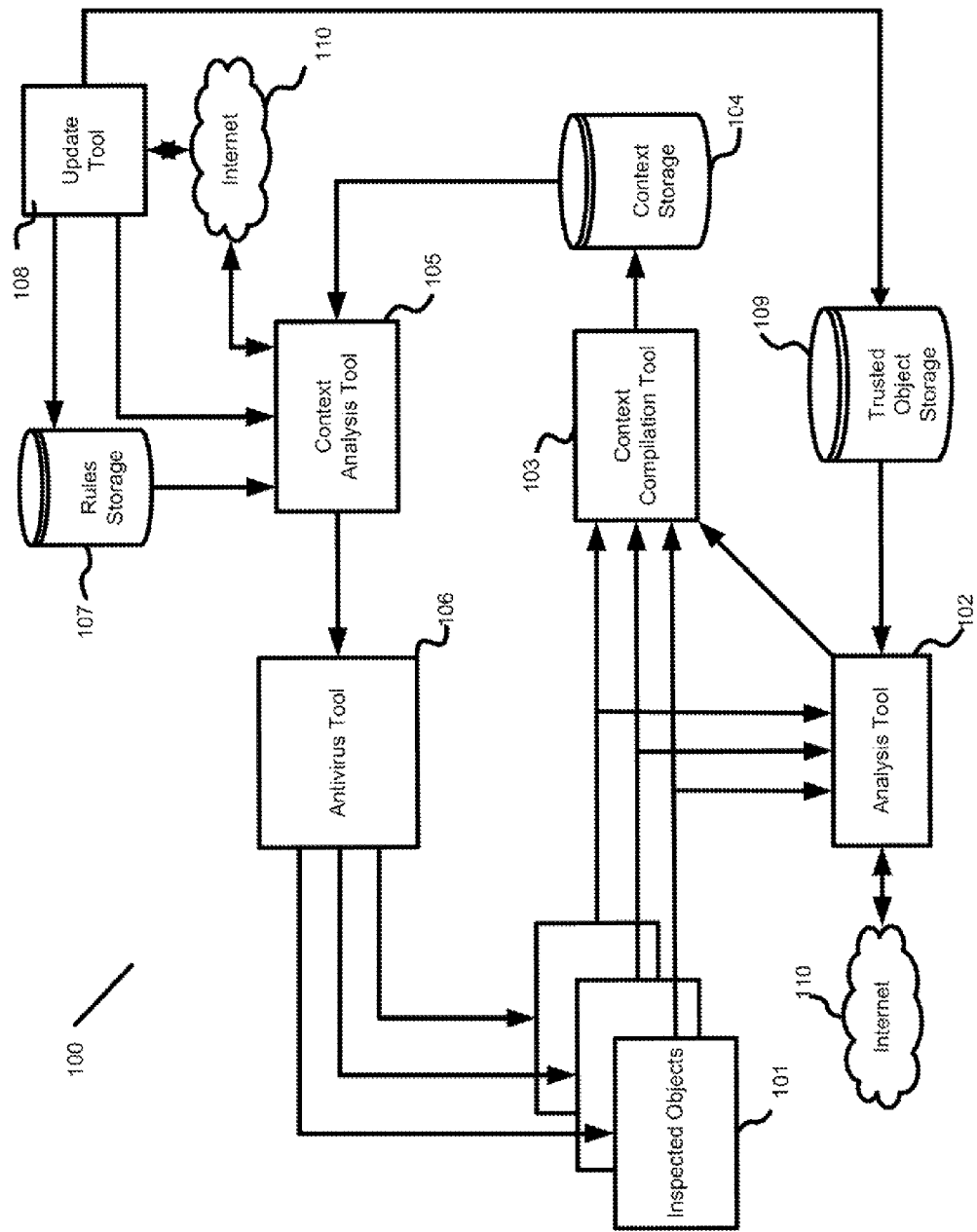
FIG. 1 illustrates a schematic diagram of a malware detection system according to one example embodiment.

FIG. 1 illustrates one example embodiment of a malware detection system. The system may be implemented on a personal computer, server, network router, mobile phone or other electronic device that need protection from computer malware (commonly referred herein as a computer). In general, the system 100 monitors execution of processes and threads launched on the computer by various software objects 101, such as programs, files, scripts, dynamic link libraries, etc., in order to detect malicious objects. In one example embodiment, the monitored object 101 may include an executable file containing command code that is located in the computer storage space, such as hard disk drive or random access memory of the computer. When the object 101 is launched, it creates a process in system memory. A process is a container in which the command code of the object 101 (e.g., executable file) is executed. The process has virtual address space where its runtime data is stored and where related dynamic libraries DLL (dynamic-link library) are mapped. A process may have multiple threads of execution. The object's code is executed within the process threads. Each process may be associated to one or more objects 101. This means that if a process or a thread performs malicious actions on the computer, then the process-launching object 101 is also malicious.

In one example embodiment, the malware detection system 100 includes an analysis tool 102, which, when a new process is launched on a computer, checks the parameters of the object 101, from which the given process was launched, by using the available operating system tools and/or a digital signature of the process-launching object 101. As a parameter of the object 101, for example, the checksum of the process-launching object 101 or the code checksum of the executable file in the virtual memory can be taken. At the first stage, the analysis tool 102 compares the parameters of inspected object 101 with the parameters of the trusted objects located in a local storage of trusted objects 109. In addition, the analysis tool 102 may check the digital signature of object 101. Digital signature is an electronic security mark which is provided by certification authority and added to the file. Thus, upon the process launch, the analysis tool 102 establishes the trustability of the process-launching object 101 by using trusted object parameters, including the parameters of digitally signed objects stored in local storage 109.

In one example embodiment, the local storage 109 can contain parameters of the most common objects only. In this case, if the analysis tool 102 is unable to find the object parameters in the storage 109, it may send a query to a remote antivirus server (not shown) via a network 110, such as the Internet. The antivirus server may maintain a full set of parameters of known malicious and trusted objects and can provide that information to the analysis tool 102.

In one example embodiment, a trusted object is an object that is known to be harmless to the computer and, therefore, it is not necessary to perform any additional malware detection actions on the trusted object as well as the processes and threads launched from that object. If however the object is not trusted, i.e. the analysis tool 102 has not found the inspected object 101 in the list of trusted objects, there is a possibility that both the object and the process it launches are harmful or malicious. Therefore, non-trusted objects 101 (also referred herein as suspicious or potentially malicious objects) are continued to be monitored by the system 100 in order to prevent malicious actions of the processes launched from these objects.

In particular, if the inspected object 101 is not trusted, then the analysis tool 102 sends the inspected object data 101 to the context compilation tool 103, which compiles a context for this object. In one example embodiment, the context is a log of events initiated by the processes (or threads) launched by the inspected object 101. In particular, the context compilation tool 103 may generate a separate context for each monitored, non-trusted object 101. The context compilation tool 103 may store generated context in a context storage 104, which may be implemented in a random access memory or permanent memory of the computer.

The events added by the context compilation tool 103 to the object contexts may include, but are not limited to new object creation event, modification of existing object event, process launch event, alteration of system register parameters event, establishment of network connection event, and other types of events.

In one example embodiment, in case of detection of potentially harmful events, such as modifications to system registry and attempts to create or modify executable files, such as .exe files, scripts, batch files, and so on, the analytical tool 102 may send a notification to the context compilation tool 103. This notification contains at least the identifier of the process-launching object, such as object checksum. It also contains the event type, such as an object modification, and the identifier of the object, to which the event is referred, such as the checksum of the modified object. Upon receiving the process event notification, the context compilation tool 103 may save this information in the context of the analyzed object 101 in the context storage 104.

Figure 2:
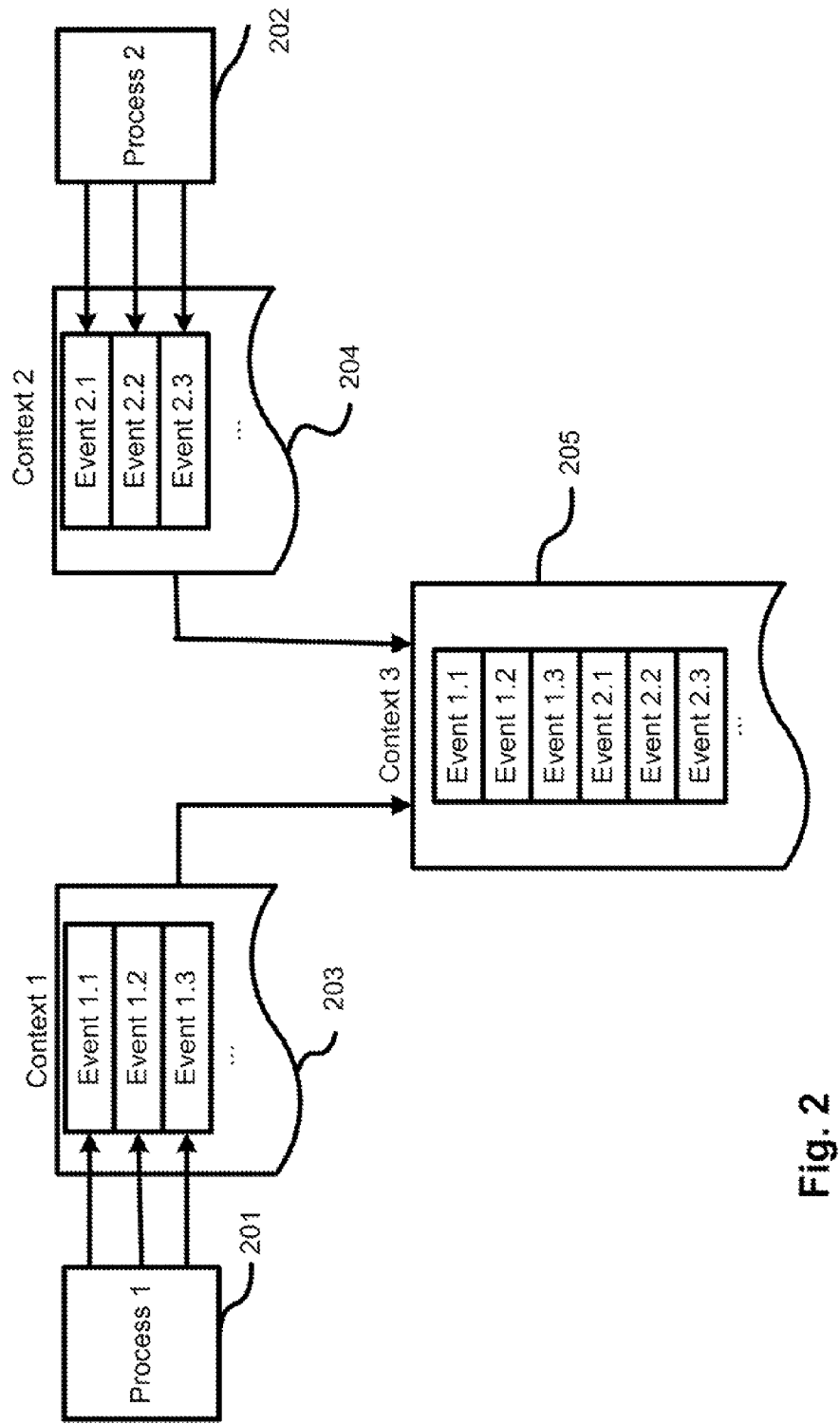
FIG. 2 illustrates an example of context merging for related processes implemented by the malware detection system according to one example embodiment.

The information collected is used further to detect malicious objects on the computer. In one example embodiment, during its operation, the context compilation tool 103 uses a context merging mechanism illustrated in FIG. 2. The context merging mechanism, i.e. the mechanism creating a common context for multiple non-trusted objects whose individual behavior does not appear malicious, is used in the case when the relation between several objects or their processes is identified in the process of their execution. In order to analyze the general security threat for the computer in this case, it may be desirable to analyze the cumulative actions of the processes launched from different, but related, non-trusted objects. For example, the relation between multiple processes launched from different objects arises in the case when one process is initiated from another (i.e., parent-child relationship), it creates a new object from which a new process is initiated, or it embeds a thread into the initiated process. In such situations, the processes are related, and not only the actions that have arisen at the execution of certain processes are analyzed, but also the cumulative actions of the related processes launched from different objects. Similar situation arises, for example, when the multi-component malware or other malware with complex infection pattern infects the computer.

As an example, a process-launching object 101 may create and launch another object. In this case, upon appearance in the system of the first process 201 that is not related to the trusted object, the context compilation tool 103 generates the context 203 in the context storage 104. This context 203 contains data about the events initiated (Event 1.1-Event 1.3) during execution of process 201. At some point during execution of process 201, an event may be generated that creates and launches a new object and this event initiates a new process 202.

When a new process 202 is launched, the context compilation tool 103 generates a separate context 204 for recording of events generated by the process 202. In one example embodiment, the context compilation tool 103 may determinate if the new process 202 relates to any other monitored process, such as process 201. In case processes 201 and 202 are related to each other, the context compilation tool 103 may generate a new separate, common context 205 which will contain all events arising during the execution of the first process 201 and the second process 202. Hence, upon the appearance of potentially harmful events, they will come to the common context 205 as well as to the individual contexts 203 or 204 of the process-launching object(s) 101 that has resulted in potentially harmful events during its execution.

As indicated above, there can be many different relations between objects/processes, and, upon detection of new related objects, the context compilation tool 103 updates the context of the new object and the common context 205 with the events generated during execution of the process launched from the new object. In particular, when a new event is detected, it is recorded in one (in the case of a single object) or several (in the case of related objects) contexts in the context storage 104. In this manner, the context compilation tool 103 may create large number of different contexts for various related objects and store these contexts in context storage 104.

In one example embodiment, a context analysis tool 105 is configured to independently analyze each context in context storage 104 for presence of malware. In particular, the context analysis tool 105 analyzes whether object is harmful or not based on the object's behavior during the execution of its process(es), which are recorded as events in the object context(s) in storage 104. More specifically, the analysis is performed on the basis of the behavior rules stored in rule storage 107. The behavior rules identify behaviors of various known types of malware, such as viruses, worms, Trojans, spam, bots, spoofers, etc. The object behavior implies a set of actions taken during the execution of the process launched from the inspected object 101. As a result of its operation, the context analysis tool 105 comes to a conclusion regarding the harmfulness of the inspected object 101 based on its context(s).

In one example embodiment, the analysis of object contexts is repeated at every appearance of a new event in the contexts or in the case when after a new event has appeared the context analysis tool 105 detects harmfulness of the object; then the context analysis tool sends the information about this object to the antivirus tool 106. The antivirus tool 106 may take appropriate remedial actions, such as terminating the process(es) initiated from the malicious object, and quarantining or deleting the object that had launched the malicious process(es).

It is possible that independent analysis of context 203 and context 204 may fail to identify malicious objects because events of each context may appear harmless or not malicious by themselves; however, analysis of the merged context 205, which includes combined set of events generated by the related processes 201 and 202 will reveal malicious behavior of these processes. This means that the malware uses a complex infection pattern, i.e. it acts by using several processes, and each process itself is not threatening or non-malicious, but their cumulative activity may be harmful to the computer. In this case, the antivirus tool 106 may disable the executions of the detected processes and delete all objects related to them.

In another example, one process 203 may perform the sequence of operations that initiates a new process or activates an existing one by, for example, embedding a thread into the existing process 202; after that the process 201 may terminate, but process 202 will continue executing. Although process 201 terminated and its individual context 203 may have been deleted from the storage 104, the combined context 205 containing the events of the terminated process 201 and events of the running process 202 remains in the storage 104 and is subject to the analysis by the context analysis tool 105. This means that the saved sequence of actions of the terminated process 201 can be used in the analysis of the related process 202 to determine its harmfulness and identify all malicious objects even after the termination of their processes.

Often, a malware initiates threads in a system process in order to hide its activity, because the system processes are typically considered trusted, they are not checked by antivirus application. The system process can be a process launched from a system file during system operation. Examples of system processes are Svchost.exe (responsible for DLL usage), Winlogon.exe (controls users log in and log out of the system), Services.exe (responsible for start and stop of system services as well as for their interaction), etc. However, if a thread is initiated in the system process, then the context compilation tool 103 may register this event; in addition, a separate context containing data of the system process actions and the common context for the related processes is generated by the context compilation tool 103. From here on, the context analysis tool 105 may monitor the activity of the system process. In case of malicious activity, the context analysis tool 105 can easily detect the way of initiation of malicious thread in the system process and delete the malicious object performing that activity.

In one example embodiment, the context analysis tool 105 is connected to a remote antivirus server (not shown) via network 110. The tool 105 sends to the antivirus server the identified malware contexts and the related contexts found during analysis of objects 101. In addition, the antivirus server can send on its part a query to the context analysis tool 105, containing the checksum of the object used for requesting the context. In this case, the context analysis tool searches for the object with the received checksum and then forwards this context, along with all related contexts, to the antivirus server. The capability for interaction with the antivirus server is useful, since it allows the antivirus server to perform a comprehensive analysis of different objects contexts obtained from different systems 100 in order to analyze behavior of new kinds of malware and generate new malware behavior rules for use by analysis tools 105.

In one example embodiment, the system 100 includes an update tool 108 that updates the rules in storage 107 and the trusted object list in storage 109. The update tool 108 uses computer networks 110 to obtain updates from the antivirus server (not shown).

In various embodiments, the system 100 implements additional mechanisms that improve its malware detection effectiveness. For example, in some situations system 100 cannot conclusively determine if a non-trusted object 101 is malicious or not based on the current version of malware behavior rules stored in storage 107 in which case, the object 101 may be quarantined by the antivirus tool 106 for a period of time, such as a week or a month, or until a new rule has not been provided by the antivirus server that will enable conclusive determination whether the quarantined object is malicious or not. In addition, the system 100 may store the context of the quarantined object in context storage 104. It is possible that after a period of time, a new rule may be created by the antivirus server that will allow conclusive identification of the quarantined object as malicious or not. Thus, after the rules storage 107 has been updated by update tool 108, the tool 108 may send the updated rules information to the context analysis tool 105. In turn, the context analysis tool 105 may analyze the previously saved contexts in the context storage 104. Such a repeated check by using new behavior rules permits to detect new malicious objects that were previously undetectable using old behavior rules. If the context of the quarantined object 101 was identified as malicious based on the new behavior rules, then the context analysis tool 105 may inform the antivirus tool 106 that quarantined object is a malicious, so that appropriate remedial actions can be taken with respect to that object.

Figure 3A:
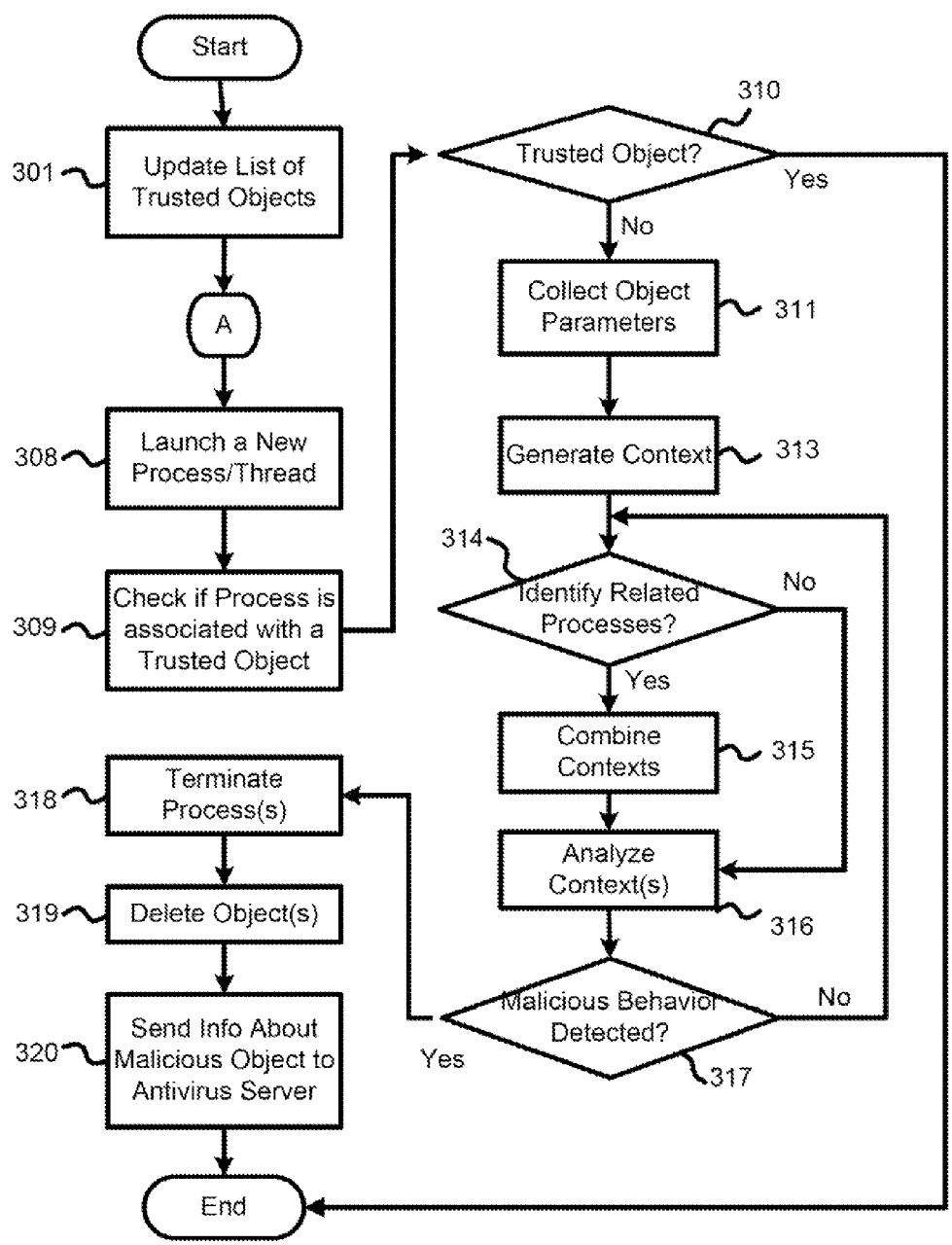
FIGS. 3A-B illustrate the algorithm of operation of the malware detection system according to one example embodiment.
Figure 3B:
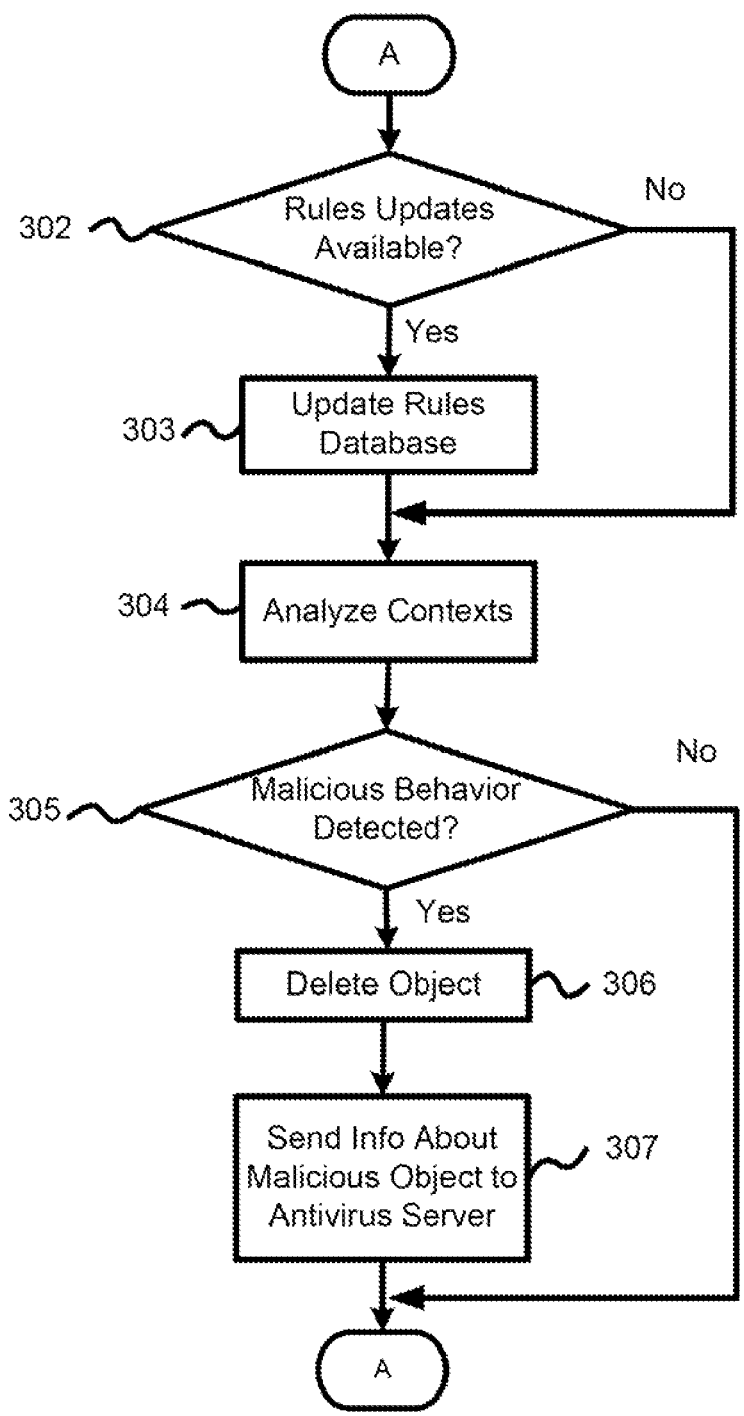

FIGS. 3A and B illustrate an example algorithm of malware detection. At step 301, the system 100 may update a list of signatures of trusted object in storage 109. At step 302, update tool 108 checks if there are any available rule updates, and updates storage 107 with new malware behavior rules at step 303. Once rules are updated, the update tool 108 informs the context analysis tool 105 about availability of new rules. At step 304, the context analysis tool 105 analyzes the contexts previously compiled and stored in the storage 104 using updated rules. If the context storage 104 does not have any previously saved contexts to check, then analysis is not performed. If at step 305 the context analysis tool 105 detects a malicious behavior pattern of a stored context, then the tool 105 sends information about this malicious context to the antivirus tool 106, which holds a suspicious object in quarantine. The antivirus tool 106 will perform appropriate remedial actions at step 306. In addition, the context analysis tool 105 may send parameters of the identified malicious object, such as object's checksum, to the antivirus server at step 307.

Once the trusted object list and the rule database have been updated at steps 301-307, the analysis tool 102 may begin monitoring execution of various processes on the computer at step 308. As soon as the new process starts, the analysis tool 102 checks the trustability of the process-launching object 101 at step 309, by for example comparing object's signature with a list of signatures of trusted objects contained in storage 109. If it is determined at step 310 that the object is trusted, then the system 100 does not collect further information about the object and allows the process initiated by the given object to run on the computer without further inspection. In this case, the system discontinues its operations with respect to this object and its processes.

If however the object 101 was not found in the trusted object list 109, this means that the inspected object 101 may be malicious. Then, the analysis tool 102 collects the object parameters in step 311 and sends them to the context compilation tool 103 which compiles the context for this object at step 313. The compiled context is saved in the context storage 104. After that, the context compilation tool 103 monitors the emerging of suspicious events in the process launched from the inspected object 101; for example, such events can be related to the creation and deletion of objects or modifications of the system registry, etc., and may terminate the process if it is conclusively determined to be malicious. If however, the process cannot be identified as malicious, at step 314, the system determines if the monitored process has any related process of threads, by for example identifying events that show a relation between the monitored process and another executed process or thread. Then, at step 315, the context compilation tool 103 merges the contexts of related objects. A new common context that contains the events of several related processes is stored in the context storage 104.

Upon adding a new event to the context(s), the context analysis tool 105 analyzes the context at step 316 using malware behavior rules from storage 107. If at step 317 the context analysis tool 105 does not detect malicious activity of the process, then this process is allowed to continue to run on the computer and the collection and analysis of events of this process continue too at step 314. If malicious activity is detected at step 317, the antivirus system 106 terminates that process and all processes related to it at step 318. Then, as step 319, the related malware objects are deleted, repairs or quarantined at step 319. In addition, at step 320, the context analysis tool 105 sends the malicious object parameters to the antivirus server.

Figure 4:
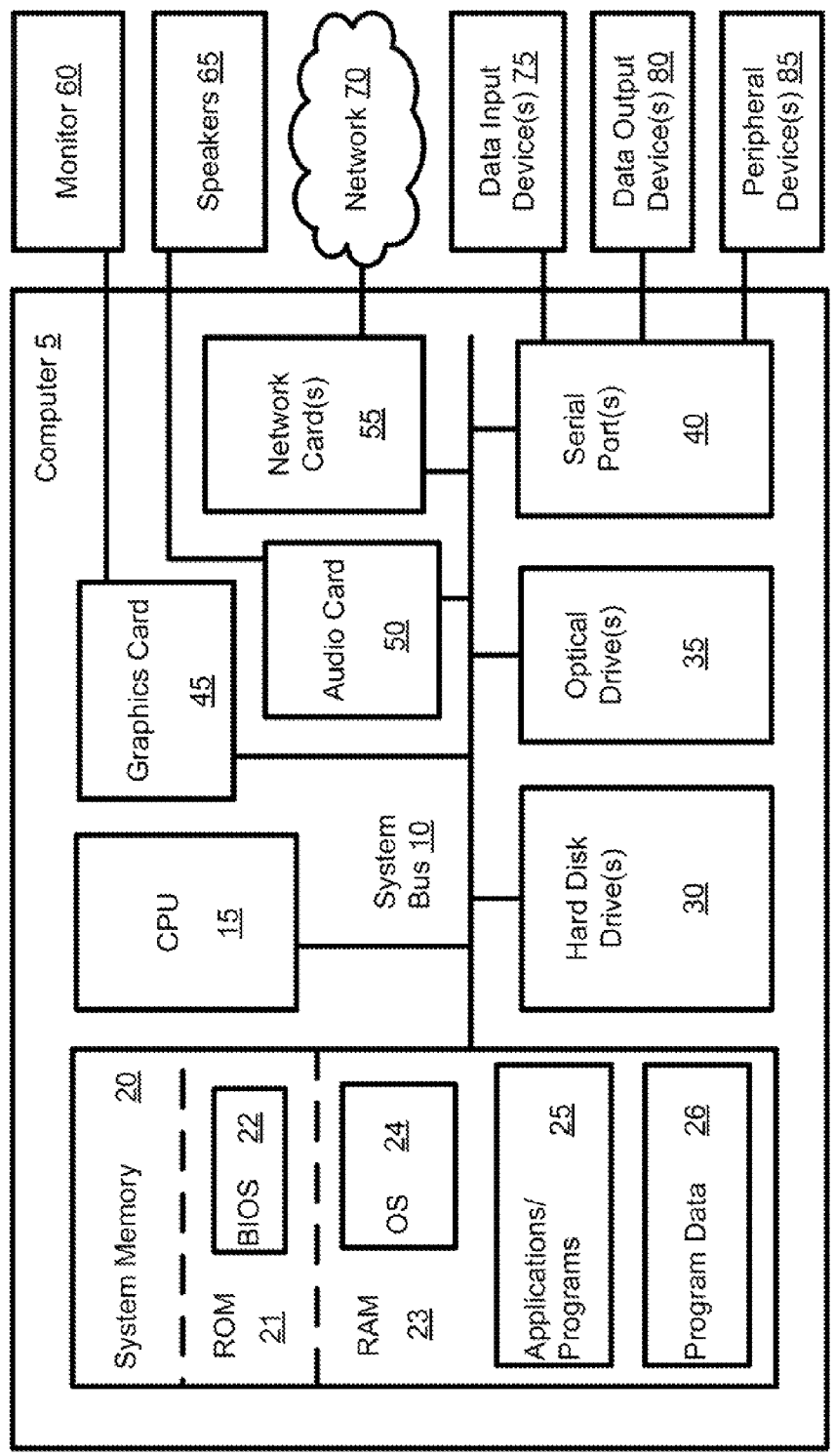
FIG. 4 illustrates a schematic diagram of a computer system according to one example embodiment.

FIG. 4 depicts an example embodiment of a computer 5 on which the malware detection system 100 may be implemented. Computer 5 may include one or more processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. System memory 20 also stores applications and programs 25, such as services 306. System memory 20 also stores various runtime data 26 used by programs 25.

Computer system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various embodiments, the algorithms and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave are included in the definition of medium.

In the interest of clarity, not all of the routine features of the embodiments are shown and described herein. It will be appreciated that in the development of any such actual implementation, numerous implementation-specific decisions must be made in order to achieve the developer's specific goals, and that these specific goals will vary from one implementation to another and from one developer to another. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

What is claimed is:

1. A method for detection of computer malware, the method comprising:
    monitoring execution of processes or threads of one or more software objects;
    determining if the one or more objects are trusted objects or non-trusted objects;
    storing, in a plurality of separate object contexts, events of execution of the monitored processes or threads of each non-trusted object;
    determining if the monitored processes or threads stored in separate object contexts are related to each other;
    merging events stored in the object contexts of related processes or threads into a common context; and
    analyzing the events of the monitored processes or threads stored both in the common context and in separate object contexts using malware behavior rules to identify malicious objects.

2. The method of claim 1 further comprising:
    terminating execution of all processes and threads associated with a malicious object; and
    deleting, quarantining or repairing the malicious object.

3. The method of claim 1 further comprising:
    determining if the one or more objects are trusted objects by computing digital signatures of the objects and checking if the digital signatures are associated with a trusted object; and
    discontinuing monitoring of one or more processes or threads of a trusted object.

4. The method of claim 3, wherein determining if an object is trusted comprises:
    comparing the digital signature of the object with a local trusted object storage; and
    if the digital signature of the object is not found in the local trusted object storage, sending a query to a remote antivirus server containing a comprehensive database of signatures of known malicious and trusted objects.

5. The method of claim 1, wherein determining if the object is trusted comprises:
    computing a checksum of the object; and
    querying a remote antivirus server to determine if the checksum associated with a malicious or trusted object.

6. The method of claim 1 further comprising:
    transmitting a context of an object to a remote antivirus server; and
    receiving from the server new malware behavior rules based on the transmitted context.

7. The method of claim 1 further comprising:
    continuing monitoring a trusted object if a process of said trusted objected embedded a thread in a system process; and
    storing in a separate object context events of execution of said system process.

8. A system for detection of computer malware, comprising:
    a memory being configured to store a list of trusted software objects and malware behavior rules; and
    a processor coupled to the memory, the processor being configured to:
        monitor execution of processes or threads of one or more software objects;
        determine if the one or more objects are trusted objects or non-trusted objects;
        store, in a plurality of separate object contexts, events of execution of the monitored processes or threads of each non-trusted object;
        determine if the monitored processes or threads stored in separate object contexts are related to each other;
        merge events stored in the object contexts of related processes and threads into a common context;
        analyze the events of execution of the monitored processes or threads stored both in the common context and in separate object contexts using malware behavior rules to identify malicious objects.

9. The system of claim 8, wherein the processor being further configured to:
    terminating execution of all processes and threads associated with a malicious object; and
    deleting, quarantining or repairing the malicious object.

10. The system of claim 8, wherein the processor being further configured to:
    determine if the one or more objects are trusted objects by computing digital signatures of the objects and comparing the digital signatures with the list of trusted software objects stored in the memory; and
    discontinue monitoring of one or more processes or threads of a trusted object.

11. The system of claim 10, wherein if the digital signature of the object is not found in the list of trusted software objects, the processor being further configured to:
    send a query to a remote antivirus server containing a comprehensive database of signatures of known malicious and trusted objects.

12. The system of claim 8, wherein to determine if the object is trusted, the computer being further configured to:
    compute a checksum of the object; and
    query a remote antivirus server to determine if the checksum associated with a malicious or trusted object.

13. The system of claim 8, wherein the processor being further configured to:
    transmit a context of an object to a remote antivirus server; and
    receive from the server new malware behavior rules based on the transmitted context.

14. The system of claim 8, wherein the processor being further configured to:
    continue monitoring a trusted object if a process of said trusted objected embedded a thread in a system process; and
    store in a separate object context events of execution of said system process.

15. A computer program product embedded in a non-transitory computer-readable storage medium, the computer-readable storage medium comprising computer-executable instructions for detection of computer malware, the instructions for:
    monitoring execution of processes or threads of one or more software objects;
    determining if the one or more objects are trusted objects or non-trusted objects;
    storing in a plurality of separate object contexts events of execution of the monitored processes or threads of each non-trusted object;
    determining if the monitored processes or threads stored in separate object contexts are related to each other;
    merging events stored in the object contexts of related processes or threads into a common context; and
    analyzing the events of the monitored processes or threads stored both in the common context and in separate object contexts using malware behavior rules to identify malicious objects.

16. The medium of claim 15 further comprising instructions for:
    determining if the one or more objects are trusted objects by computing digital signatures of the objects and checking if the digital signatures are associated with a trusted object; and
    discontinuing monitoring of one or more processes or threads of a trusted object.

17. The medium of claim 16, wherein instructions for determining if an object is trusted further comprise instructions for:
    comparing the digital signature of the object with a local trusted object storage; and
    if the digital signature of the object is not found in the local trusted object storage, sending a query to a remote antivirus server containing a comprehensive database of signatures of known malicious and trusted objects.

18. The medium of claim 15, wherein instructions for determining if the object is trusted further comprise instructions for:
    computing a checksum of the object; and
    querying a remote antivirus server to determine if the checksum associated with a malicious or trusted object.

19. The medium of claim 15 further comprising instructions for:
    transmitting a context of an object to a remote antivirus server; and
    receiving from the server new malware behavior rules based on the transmitted context.

20. The medium of claim 15 further comprising instructions for:
    continuing monitoring a trusted object if a process of said trusted objected embedded a thread in a system process; and
    storing in a separate object context events of execution of said system process.

\* \* \* \* \*